(12) United States Patent
Baek et al.

(10) Patent No.: US 8,893,002 B2
(45) Date of Patent: Nov. 18, 2014

(54) METHOD FOR PROVIDING DATA APPLICATION OF DISK MEDIA PLAYBACK APPARATUS

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 444 days.

(21) Appl. No.: 12/937,111

(22) PCT Filed: Apr. 10, 2009

(86) PCT No.: PCT/KR2009/001858
§ 371 (c)(1),
(2), (4) Date: Oct. 8, 2010

(87) PCT Pub. No.: WO2009/126000
PCT Pub. Date: Oct. 15, 2009

(65) Prior Publication Data
US 2011/0029872 A1    Feb. 3, 2011

(30) Foreign Application Priority Data
Apr. 10, 2008 (KR) ................. 10-2008-0033192

(51) Int. Cl.
*G06F 3/00* (2006.01)
*G11B 27/11* (2006.01)
*G11B 27/10* (2006.01)

(52) U.S. Cl.
CPC .............. *G11B 27/11* (2013.01); *G11B 27/105* (2013.01); *G11B 2220/65* (2013.01); *G11B 2220/2541* (2013.01)
USPC ......... 715/716; 386/219; 386/220; 369/275.3

(58) Field of Classification Search
CPC ...... G11B 7/00745; G11B 20/10; H04N 5/85; H04N 9/8042
USPC ................. 715/716; 369/275.3; 386/219, 220
See application file for complete search history.

(56) References Cited

U.S. PATENT DOCUMENTS 6,160,953 A * 12/2000 Fuchigami et al. ........... 386/339
6,339,572 B1 * 1/2002 Hamada et al. .............. 369/53.2
(Continued)

FOREIGN PATENT DOCUMENTS

EP     1 553 769 A1    7/2005
JP     2003-275303 A   9/2003
(Continued)

OTHER PUBLICATIONS

"Application Definition Blu-ray Disc Format BD-J Baseline Application and Logical Model Definition for BD-ROM", dated Mar. 1, 2005, pp. 1-45, XP007904998 Retrieved from the internet: URL: http://www.blurayjukebox.com/pdfs/bdj_gem_application_definition_050307-13404 [retrieved on Jun. 18, 2008].

(Continued)

*Primary Examiner* — Tadeese Hailu
(74) *Attorney, Agent, or Firm* — Stein IP, LLC

(57) ABSTRACT

A method for providing a data application of a disk media playback apparatus is disclosed. In accordance with the present invention, a time necessary for loading and executing a data application and a limit in a size of the application are minimized and a personalized data application is provided based on a disk media playback apparatus identification or a user identification information.

11 Claims, 3 Drawing Sheets

(56) References Cited

U.S. PATENT DOCUMENTS

| | | | |
|---|---|---|---|
| 7,639,923 B2* | 12/2009 | Ikeda et al. | 386/335 |
| 8,107,789 B2* | 1/2012 | Hashimoto et al. | 386/248 |
| 2001/0006771 A1* | 7/2001 | Kajiyama et al. | 434/307 A |
| 2002/0150383 A1* | 10/2002 | Kato et al. | 386/69 |
| 2003/0122862 A1* | 7/2003 | Takaku et al. | 345/723 |
| 2004/0255236 A1* | 12/2004 | Collart | 715/500.1 |
| 2005/0044481 A1* | 2/2005 | Collart | 715/500.1 |
| 2005/0169604 A1 | 8/2005 | Kim et al. | 386/69 |
| 2006/0098936 A1* | 5/2006 | Ikeda et al. | 386/46 |
| 2006/0245742 A1 | 11/2006 | Ashley et al. | 386/126 |
| 2007/0274180 A1* | 11/2007 | Kato et al. | 369/47.16 |
| 2007/0286575 A1 | 12/2007 | Oashi et al. | 386/95 |
| 2008/0031601 A1* | 2/2008 | Hashimoto et al. | 386/126 |
| 2008/0260355 A1 | 10/2008 | Baek et al. | 386/123 |
| 2009/0178090 A1* | 7/2009 | Oztaskent | 725/90 |

FOREIGN PATENT DOCUMENTS

| | | |
|---|---|---|
| JP | 2004-246509 A | 9/2004 |
| JP | 2005-266286 A | 9/2005 |
| JP | 2007-205825 A | 8/2007 |
| KR | 10-2005-0078498 A | 8/2005 |
| KR | 10-2006-0015728 A | 2/2006 |
| KR | 10-2006-0129617 A | 12/2006 |

OTHER PUBLICATIONS

Notice of Allowance dated Oct. 23, 2009, issued by Korean Patent Office, in corresponding application KR 10-2008-0033192.

International Search Report dated Nov. 26, 2009, issued by WIPO, in corresponding application PCT/KR2009/001858.

First Office Action dated Sep. 18, 2012, issued by Japanese Patent Office, in corresponding application JP2011-503914.

Third Office Action dated Feb. 20, 2013, issued by Chinese Patent Office, in corresponding application CN200980121473.4.

European Search Report dated Jun. 30, 2014, issued by European Patent Office, in corresponding application EU09729483.9.

* cited by examiner

METHOD FOR PROVIDING DATA APPLICATION OF DISK MEDIA PLAYBACK APPARATUS

CROSS-REFERENCE TO RELATED APPLICATIONS

This is a National Phase Application filed under 35 U.S.C. 371 as a national stage of PCT/KR2009/001858, filed on Apr. 10, 2009 and claiming benefit to Korean Patent Application No. 10-2008-0033192, filed on Apr. 10, 2008, the entire content of which is hereby incorporated by reference in its entirety.

TECHNICAL FIELD

The present invention relates to a method for providing a data application of a disk media playback apparatus, and more particularly to a method for providing a data application of a disk media playback apparatus wherein a time necessary for loading and executing a data application and a limit in a size of the application are minimized and a personalized data application is provided based on a disk media playback apparatus identification or a user identification information.

BACKGROUND ART

Generally, an optical disk records an information such as a voice or an image converted into a digital symbol on a surface thereof using a laser beam. In order to read the information recorded in the optical disk, the laser beam is radiated upon the surface of the optical disk and the laser beam reflected from the surface is sensed.

CD (Compact Disk), DVD (Digital Versatile Disc) and LD (Laser Disc) are well-known conventional optical disk storage media.

A next-generation optical disk storage media capable of holding a large amount of data compared to the conventional optical disk storage media is under development as a HD (Hi-Definition) broadcasting is becoming more popular.

A HD-DVD and a Btu-ray disk are some of the next-generation optical disk storage media.

The blue laser having a wavelength of 405 nm is used for reading the HD-DVD instead of a red laser having a wavelength of 650 nm used for reading the DVD, more data can be stored in the HD-DVD than DVD. Specifically, a single layer HD-DVD is capable of storing up to 15 GB of data and a dual layer HD-DVD is capable of storing up to 30 GB of data.

While the blue laser having a wavelength of 405 nm is used for reading the Blu-ray disk similar to the HD-DVD, more data can be stored in the Blu-ray disk than HD-DVD. Specifically, a single layer Blu-ray disk is capable of storing up to 25 GB of a data and a dual layer Blu-ray disk is capable of storing up to 50 GB of the data. Moreover, a quad layer Blu-ray disk and an octal layer Blu-ray disk can store up to 100 GB and 200 GB, respectively.

A hi-definition video can easily be enjoyed and a large amount of data can be stored owing to the next-generation optical disk storage media such as the HD-DVD and the Blu-ray disk.

Hereinafter, "disk media" refers to the next-generation optical disk storage media such as the HD-DVD and the Blu-ray disk as well as the conventional optical disk storage media such as CD, DVD and LD. In addition, "disk media playback apparatus" refers to an apparatus capable of playing the data stored in the disk media.

HDi or BD-J specification is under development in order to provide a data application service of the disk media playback apparatus.

HDi is a standard specification that supports the data application service of the disk media playback apparatus supporting the HD-DVD, and BD-J specification is a standard specification that supports that of the disk media playback apparatus supporting the Blu-ray disk.

The data application service of the conventional disk media playback apparatus has following disadvantages.

First, the disadvantage lies in the disk media playback apparatus itself.

Recently, although the disk media playback apparatus is becoming more advanced, the size of the data application that can be processed by the disk media playback apparatus is limited. That is, when the size of the data application is too large, the data application cannot executed by the disk media playback apparatus due to the limit in a resource thereof such as a size of a memory or a processing speed of a CPU.

Second, the disadvantage is caused by the time necessary for executing the data application.

The disk media playback apparatus loads and executes the data application. When a large data application is loaded and executed, a long time is necessary to load and process the data application.

Third, the disadvantage is caused by a limited bandwidth.

Specifically, the disk media playback apparatus provides the data application by establishing a communication with a data application providing server to receive the data application. That is, the disk media playback apparatus communicates with the data application providing server via the digital broadcasting network having the limited bandwidth. Therefore, a configuration and/or the number of the data application should be minimized in order to be transmitted via the limited bandwidth.

Accordingly, a personalized data application cannot be provided due to the limit in the configuration and the number of the data application.

DISCLOSURE

Technical Problem

It is an object of the present invention to provide a method for providing a data application of a disk media playback apparatus wherein a time necessary for loading and executing a data application and a limit in a size of the application is minimized and a personalized data application ins provided based on a disk media playback apparatus identification or a user identification information.

Technical Solution

In accordance with a first aspect of the present invention, there is provided a method for providing a data application of a disk media playback apparatus, the method comprising steps of: (a) obtaining a scene configuration information for a scene of the data application; (b) obtaining one or more components constituting the scene based on the scene configuration information; and (c) providing the data application based on the scene configuration information and the one or more components.

Preferably, the step (a) comprises obtaining the scene configuration information by reading a disk media inserted in the disk media playback apparatus.

Preferably, the step (a) comprises obtaining the scene configuration information stored in the disk media playback apparatus.

Preferably, the step (a) comprises receiving the scene configuration information through a communication network.

Preferably, the step (a) comprises obtaining the scene configuration information from a storage device connected to the disk media playback apparatus.

Preferably, the scene configuration information defines a scene configuration for the scene selected based on at least one of a user input, an identification information of the disk media playback apparatus and a user identification information of a user using the disk media playback apparatus.

Preferably, the scene configuration information comprises an execution code for interpreting the scene configuration information.

Preferably, the scene configuration information comprises a text data for the scene.

Preferably, each of the one or more components comprises at least one of an independently executable code, a text data, an image data, an audio data and a video data.

Preferably, the scene configuration information comprises a location information for each of the one or more components, and wherein the step (b) comprises obtaining the one or more components based on the location information.

Preferably, the location information comprises a download path information, and wherein the step (b) comprises: (b-1) transmitting a transmission request for the one or more components to an apparatus for providing the one or more components; and (b-2) receiving the one or more components from the apparatus according to the download path information.

Preferably, the transmission request comprises one of an identification information of the disk media playback apparatus and user identification information of a user using the disk media playback apparatus.

Preferably, the step (c) comprises: (c-1) configuring a layout for the scene based on the scene configuration information; and (c-2) displaying the one or more components according to the layout.

Preferably, the step (c-2) comprises displaying the one or more components according to a received order thereof.

Advantageous Effects

The method in accordance with the present invention is advantageous in that a time necessary for loading and executing a data application is minimized. The method is also advantageous in that a limit in the number of or the size of the data application is also minimized. In addition, the personalized data application can be provided based on the disk media playback apparatus identification information or the user identification information.

BEST MODE

A preferred embodiment of a method for providing a data application of a disk media playback apparatus in accordance with the present invention will be described in detail described with reference to accompanied drawings.

Figure 1:
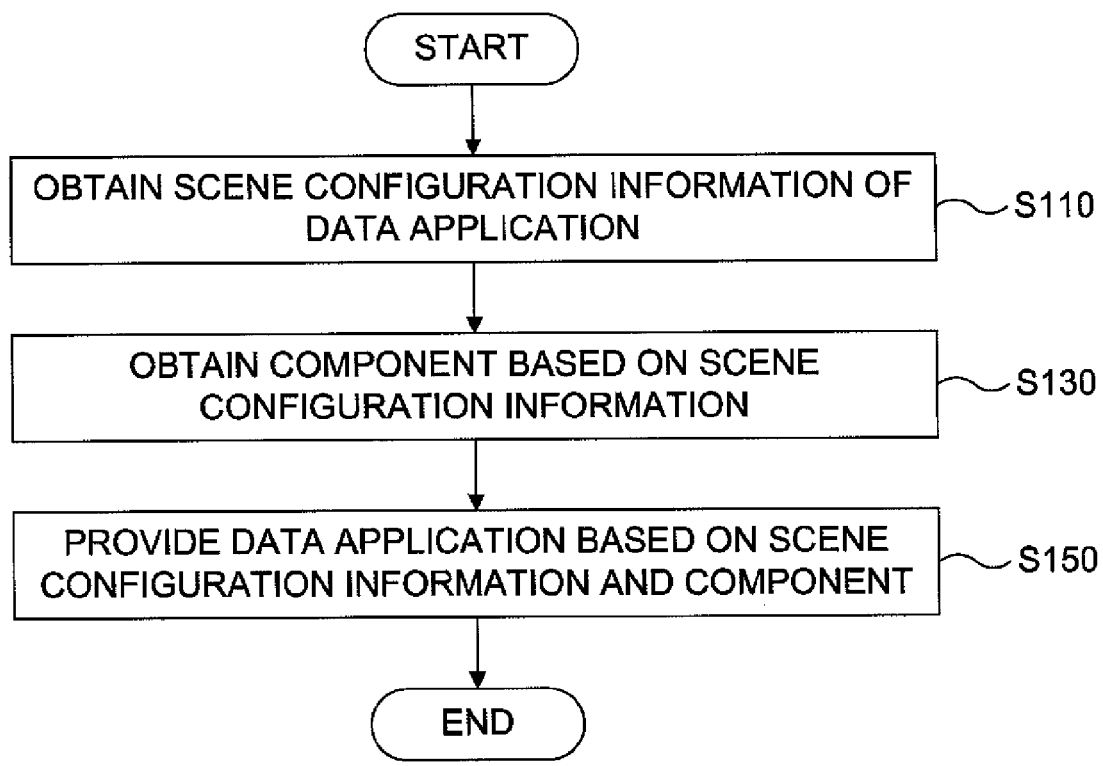
FIG. 1 is a flow diagram exemplifying a method for providing a data application of a disk media playback apparatus carried out in the disk media playback apparatus for providing the data application in accordance with the present invention.

FIG. 1 is a flow diagram exemplifying a method for providing a data application of a disk media playback apparatus carried out in the disk media playback apparatus for providing the data application in accordance with the present invention.

Referring to FIG. 1, a scene configuration information for a scene of the data application is obtained (S110).

Conventionally, the disk media playback apparatus reads an entirety of the data application, and then executes the data application. Contrarily, in accordance with the present invention, the disk media playback apparatus obtains only the scene configuration information.

In one embodiment, the scene configuration information may be obtained from a disk media.

A manufacturer of content stored in the disk media may provide, along with the content, the scene configuration information associated with the content by way of the disk media.

When the disk media including the scene configuration information is inserted in the disk media playback apparatus, the disk media playback apparatus obtains the scene configuration information by reading the disk media.

In another embodiment, the scene configuration information may be obtained from the disk media playback apparatus when the scene configuration information is stored therein.

A manufacturer of the disk media playback apparatus may provide the disk media playback apparatus having the scene configuration information stored therein.

When the scene configuration information is stored in the disk media playback apparatus, the scene configuration information may be obtained from the disk media playback apparatus.

In yet another embodiment, the scene configuration information may be received via a communication network.

The scene configuration information may be obtained by establishing a communication with a device providing the scene configuration information.

For instance, the scene configuration information may be obtained through the communication network from an apparatus for providing the scene configuration information run by the manufacturer of the content or the disk media playback apparatus.

In yet another embodiment, the scene configuration information may be obtained from a storage device connected to the disk media playback apparatus. For instance, when the storage device such as a USB stick storing the scene configuration information is connected to the disk media playback apparatus, the scene configuration information is obtained from the storage device.

A detailed description of the scene configuration information is given below.

Figure 2:
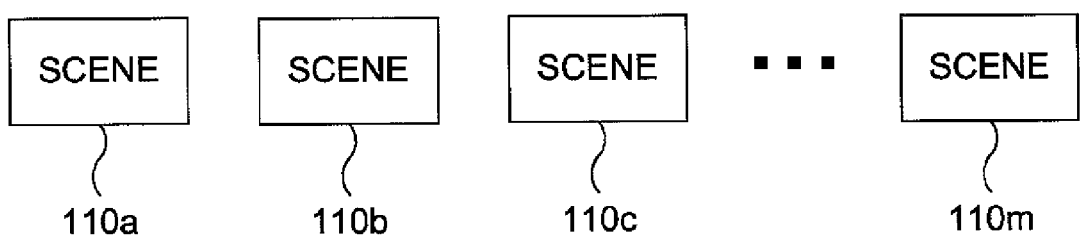
FIG. 2 is a diagram exemplifying scenes in accordance with the method of the present invention.

FIG. 2 is a diagram exemplifying scenes in accordance with the method of the present invention.

Referring to FIG. 2, the data application includes one or more scenes 110a through 110m.

When the data application is provided to a user by the disk media playback apparatus, the user may select one of the one or more scenes 110a through 110m through a user input, and the disk media playback apparatus provides the selected scene to the user.

For instance, the scene 110a may be an initial screen provided to the user when the disk media playback apparatus executes the data application. The scene 110b may be a screen provided to the user when a certain button of a remote control is pressed by the user.

When a personalized data application is to be provided, the scene 110a may be a screen provided to a first user group and the scene 110b may be a screen provided to the second user group.

When the personalized data application is provided, the disk media playback apparatus selects one of the one or more scenes 110a through 110m based on an identification information of the disk media playback apparatus or a user identification information, and the selected scene is provided to the user.

Each of the scenes 110a through 110m comprises one or more components (not shown).

For instance, when a stock exchange quotation is displayed on the scene 110b, the scene 110b may comprise a first component for providing Korean stock index in a form of text, a second component for providing a stock information of a certain company listed in Korean stock market, a third component for providing a video related to Korean stock market, and a fourth component for providing information on US stock market in a form of text or video.

That is, the scene configuration information may include a component information on the one or more component constituting each of the one or more scenes 110a through 110m.

The component information includes a name of the component and/or an identification information thereof. The component information may further include a location information of the component necessary for obtaining the component by the disk media playback apparatus.

When the component is stored in the disk media, the location information points to a path of the component in the disk media. When the component is stored in an external device, the location information points to the external device and a path of the component stored in external device.

The scene configuration information may include a layout information for the scene. The layout information defines how the components are arranged in the scene. For instance, when the first component and the second component constitutes the scene 110a, the scene configuration information for the scene 110a includes an identification information of the first component, a download path of the first component, a layout information of the first component, an identification information of the second component, a download path of the second component and a layout information of the second component.

The location informations for the first component and the second component may be same or differ from each other. For instance, the first component may be read from the disk media and the second component may be received from the external.

In addition, the scene configuration information of a certain scene may be obtained or the scene configuration information of an entirety of the scenes may be obtained.

Referring to FIG. 2, the scene configuration information for the scene 110a is obtained first and the scene configuration information for the scene 110b is then obtained if necessary.

For instance, when the user requests the scene 110a, the disk media playback apparatus may receive the scene configuration information for the scene 110a, and when the user additionally requests the scene 110m, the disk media playback apparatus may then receive the scene configuration information for the scene 110m.

In accordance with the present invention, the disk media playback apparatus extracts from the scene configuration information and interprets the component information and the layout information.

In order to interpret the component information and the layout information, i.e. the scene configuration information, an execution code is required.

The disk media playback apparatus utilizes the execution code to interpret the scene configuration information. The execution code may be stored in the disk media playback apparatus.

When the execution code is included in the scene configuration information instead of the disk media playback apparatus, the disk media playback apparatus may execute the execution code and interpret the scene configuration information.

The execution code may be executed independently from programs necessary for providing broadcasting programs and executing the data application.

In addition, the scene configuration information may include a text data for the scene.

The text data includes a text that is to be displayed in the scene such as a description of the scene.

Referring back FIG. 1, the one or more components constituting the scene is obtained based on the scene configuration information (S130).

The disk media playback apparatus may obtain each of the one or more components based on the location information.

Figure 3:
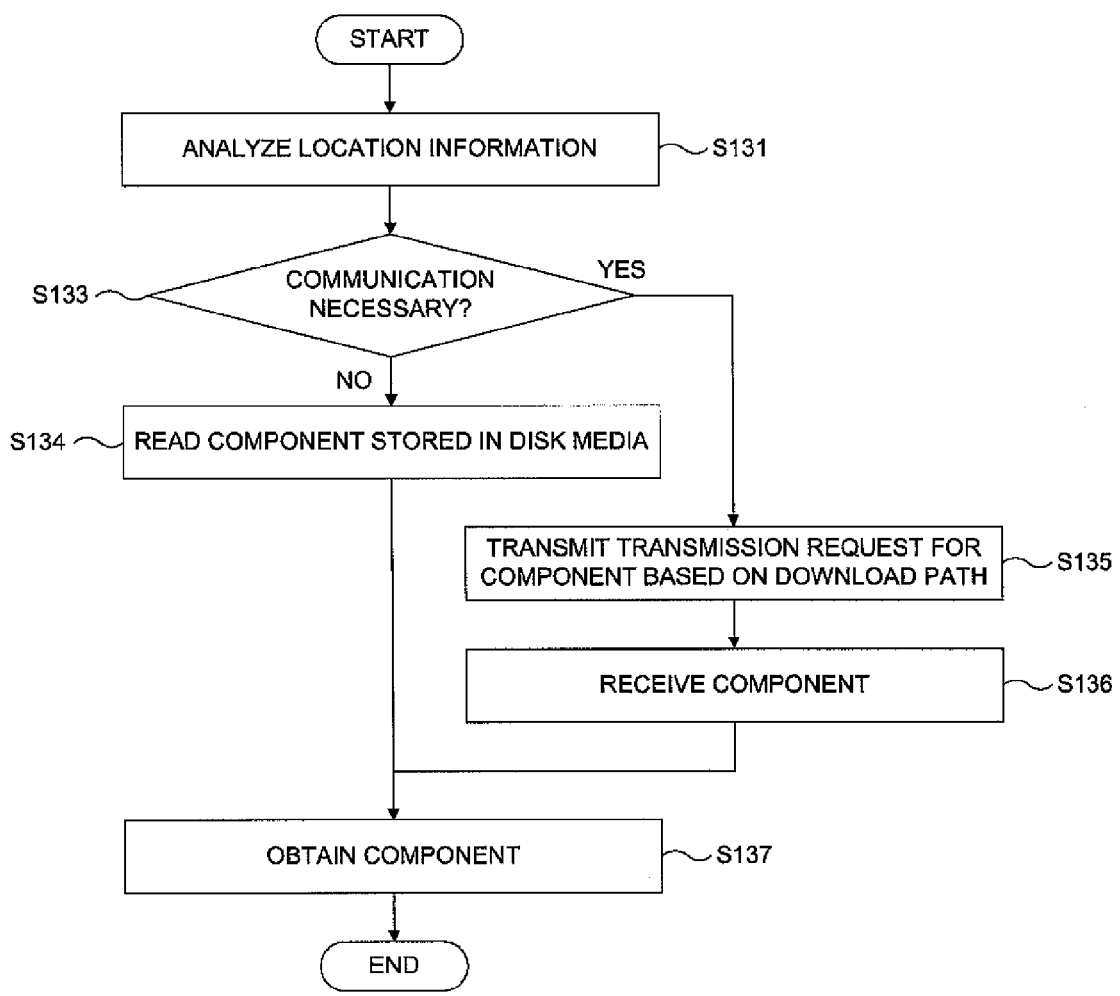
FIG. 3 is a flow diagram illustrating the step S130 for obtaining the one or more components constituting the scene.

FIG. 3 is a flow diagram illustrating the step S130 for obtaining the one or more components constituting the scene.

Referring to FIG. 3, the location information is analyzed (S131).

Thereafter, the disk media playback apparatus determines whether a communication is necessary based on the location information (S133).

When the communication is not necessary, that is, when at least one of the one or more components is stored in the disk media, the disk media playback apparatus reads the component from the disk media (S134).

When the communication is not necessary, that is, when at least one of the one or more components is stored in the external device, the disk media playback apparatus communicates with the external device and receives the component from the external device.

Specifically, the disk media playback apparatus transmits a transmission request for the one or more components to the external device that provides the one or more components by referring to the download path pointed by the location information (S135).

The transmission request may include the identification information of the disk media playback apparatus or the user identification information.

The identification informations may be used to provide the personalized data application.

The apparatus selects the component based on the identification information of the disk media playback apparatus or the user identification information and transmits the selected component to the disk media playback apparatus.

Thereafter, the one or more components are downloaded from the apparatus by referring to the download path pointed by the location information (S136).

The download path for the one or more components may be same or differ from each other.

For instance, the first component may be read from the disk media and the second component may be received from the external.

When a stock exchange quotation is displayed on the scene 110b of FIG. 2, the scene 110b may comprise a first component for providing Korean stock index in a form of text, a second component for providing a stock information of a certain company listed in Korean stock market, a third component for providing a video related to Korean stock market, and a fourth component for providing information on US stock market in a form of text or video.

Specifically, the first component may include the text data. The second component may include an execution code for receiving a user input for selecting a company, an execution code for displaying the stock information in graphs, and a graph image data. The third component may include a video data. The fourth component may include the text data or the video data. The execution code included in the second component may be executed independently in the scene rather than being executed for an entirety of the data application.

Referring back to FIG. 1, the data application is provided based on the scene configuration information and the one or more components (S150).

Figure 4:
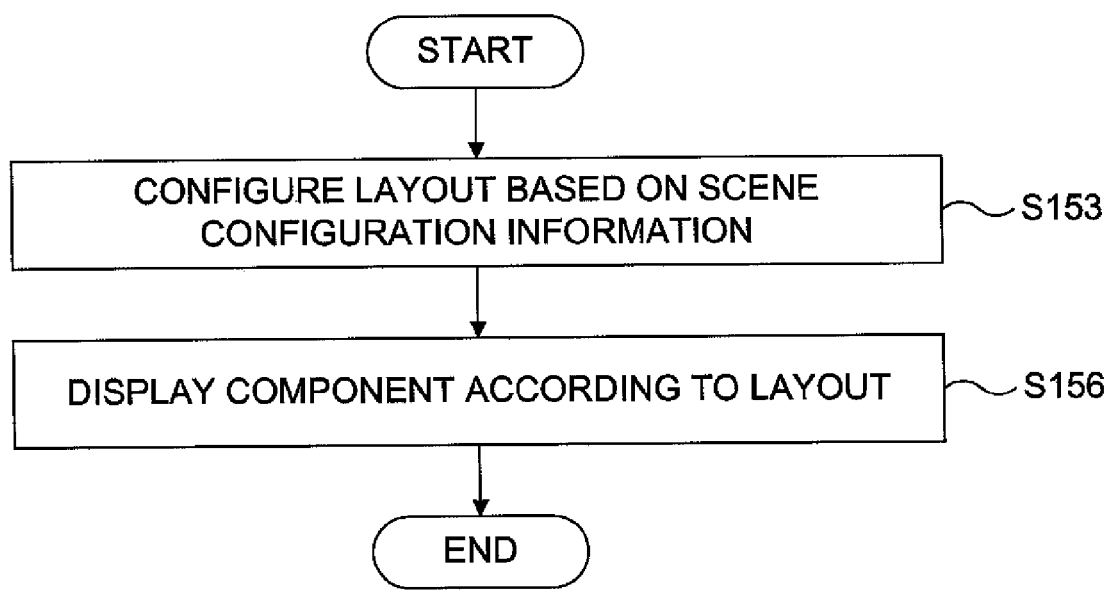
FIG. 4 is a flow diagram illustrating the step S150 for providing the data application.

FIG. 4 is a flow diagram illustrating the step S150 for providing the data application.

Referring to FIG. 4, the layout is configured for the scene based on the layout information included in the scene configuration information (S153).

Thereafter, the one or more components are displayed according to the layout configured in the step S153 (S156).

The one or more components may be sequentially displayed according to a received order thereof.

For instance, the first component is displayed according to the layout when the first component is obtained, and the second component may be then displayed according to the layout when the second component is obtained.

Mode for Invention

Figure 5:
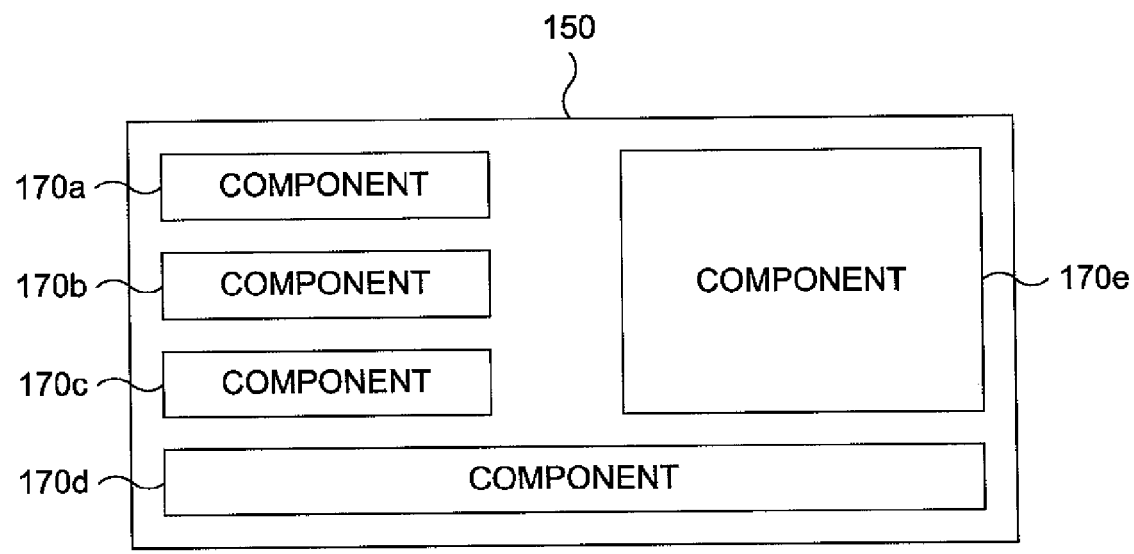
FIG. 5 is a diagram exemplifying the layout of the scene in accordance with the method of the present invention.

FIG. 5 is a diagram exemplifying the layout of the scene in accordance with the method of the present invention.

Referring to FIG. 5, the scene of the data application is displayed on a display device 150 connected to the disk media playback apparatus.

The scene in FIG. 5 includes components 170a through 170e.

The layout information defines an arrangement of the components 170a through 170e displayed on the display device 150.

The layout is configured based on the layout information and the components 170a through 170e are arranged according to the layout.

A detailed description of the personalized data application is described when the component 170e of FIG. 5 is an advertisement video.

The apparatus for providing the components selects one of the advertisement video based on the disk media playback apparatus identification information or the user identification information in order to provide an advertisement suitable for the user. The selected advertisement video is then designated as the component 170e and transmitted to the disk media playback apparatus.

The disk media playback apparatus displays the advertisement video, which is the component 170e, on the display device according to the layout. The personalized data application can be provided because the advertisement video is selected based on the disk media playback apparatus identification information or the user identification information.

In accordance with the present invention, a time necessary for loading and executing the data application is minimized. A limit in the number of or the size of the data application is also minimized. In addition, the personalized data application can be provided based on the disk media playback apparatus identification information or the user identification information.

While the present invention has been particularly shown and described with reference to the preferred embodiment thereof, it will be understood by those skilled in the art that various changes in form and details may be effected therein without departing from the spirit and scope of the invention as defined by the appended claims.

Industrial Applicability

In accordance with the present invention, a time necessary for loading and executing the data application is minimized. A limit in the number of or the size of the data application is also minimized. In addition, the personalized data application can be provided based on the disk media playback apparatus identification information or the user identification information.

The invention claimed is:

1. A method for providing a data application at a disk media playback apparatus, the method comprising steps of:
    (a) at the disk media playback apparatus, obtaining a scene configuration information for a scene of the data application;
    (b) at the disk media playback apparatus, obtaining two or more components constituting the scene based on the scene configuration information; and
    (c) at the disk media playback apparatus, providing the data application based on the scene configuration information and the two or more components,
    wherein the scene configuration information defines a scene configuration for the scene selected, by the disk media playback apparatus, based on at least one of identification information of the disk media playback apparatus and user identification information if a user using the disk media playback apparatus, and
    wherein step (c) includes:
    (c-1) configuring a layout for the scene based on the scene configuration information; and
    (c-2) displaying the two or more components according to the layout and according to a received order of the two or more components.

2. The method in accordance with claim 1, wherein the step (a) comprises obtaining the scene configuration information by reading a disk media inserted in the disk media playback apparatus.

3. The method in accordance with claim 1, wherein the step (a) comprises obtaining the scene configuration information stored in the disk media playback apparatus.

4. The method in accordance with claim 1, wherein the step (a) comprises receiving the scene configuration information through a communication network.

5. The method in accordance with claim 1, wherein the step (a) comprises obtaining the scene configuration information from a storage device connected to the disk media playback apparatus.

6. The method in accordance with claim 1, wherein the scene configuration information comprises an execution code for interpreting the scene configuration information.

7. The method in accordance with claim 1, wherein the scene configuration information comprises a text data for the scene.

8. The method in accordance with claim 1, wherein each of the one or more components comprises at least one of an independently executable code, a text data, an image data, an audio data and a video data.

9. The method in accordance with claim 1, wherein the scene configuration information comprises a location information for each of the one or more components, and wherein the step (b) comprises obtaining the one or more components based on the location information.

10. The method in accordance with claim 9, wherein the location information comprises a download path, and wherein the step (b) comprises:
   (b-1) transmitting a transmission request for the one or more components to an apparatus for providing the one or more components; and
   (b-2) receiving the one or more components from the apparatus according to the download path.

11. The method in accordance with claim 10, wherein the transmission request comprises one of an identification information of the disk media playback apparatus and user identification information of a user using the disk media playback apparatus.

* * * * *